June 29, 1965
C. HORBERG, JR
3,192,350
SEALED ELECTRICAL SWITCHING CONTROL
UNIT USING LINEAR CAM ACTUATOR
Filed Dec. 6, 1961
3 Sheets-Sheet 1
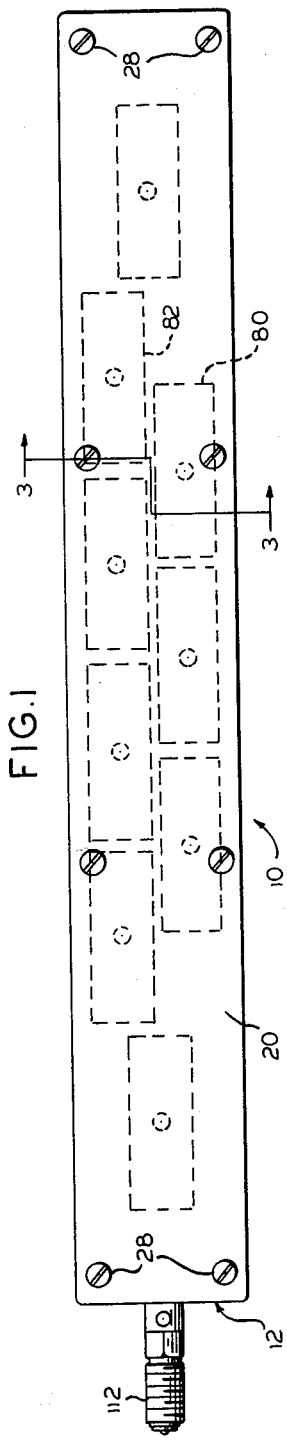
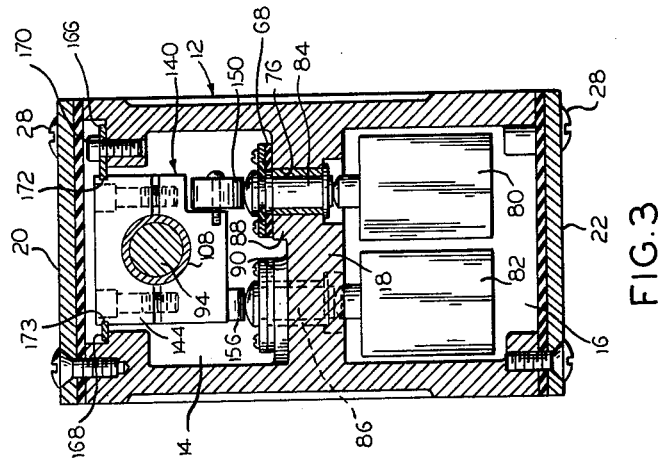
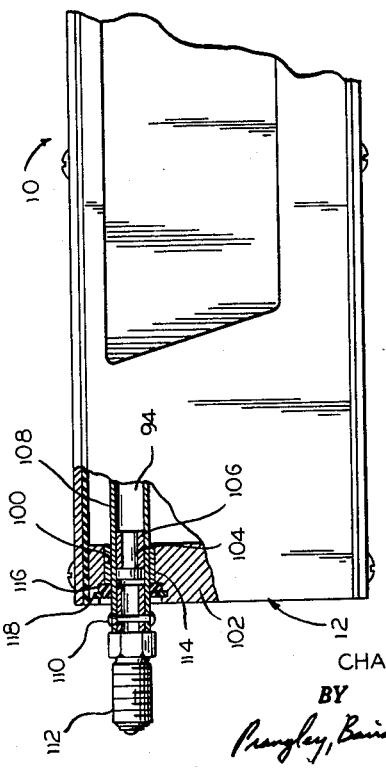
INVENTOR.
CHARLES HORBERG JR.
BY
ATTORNEYS

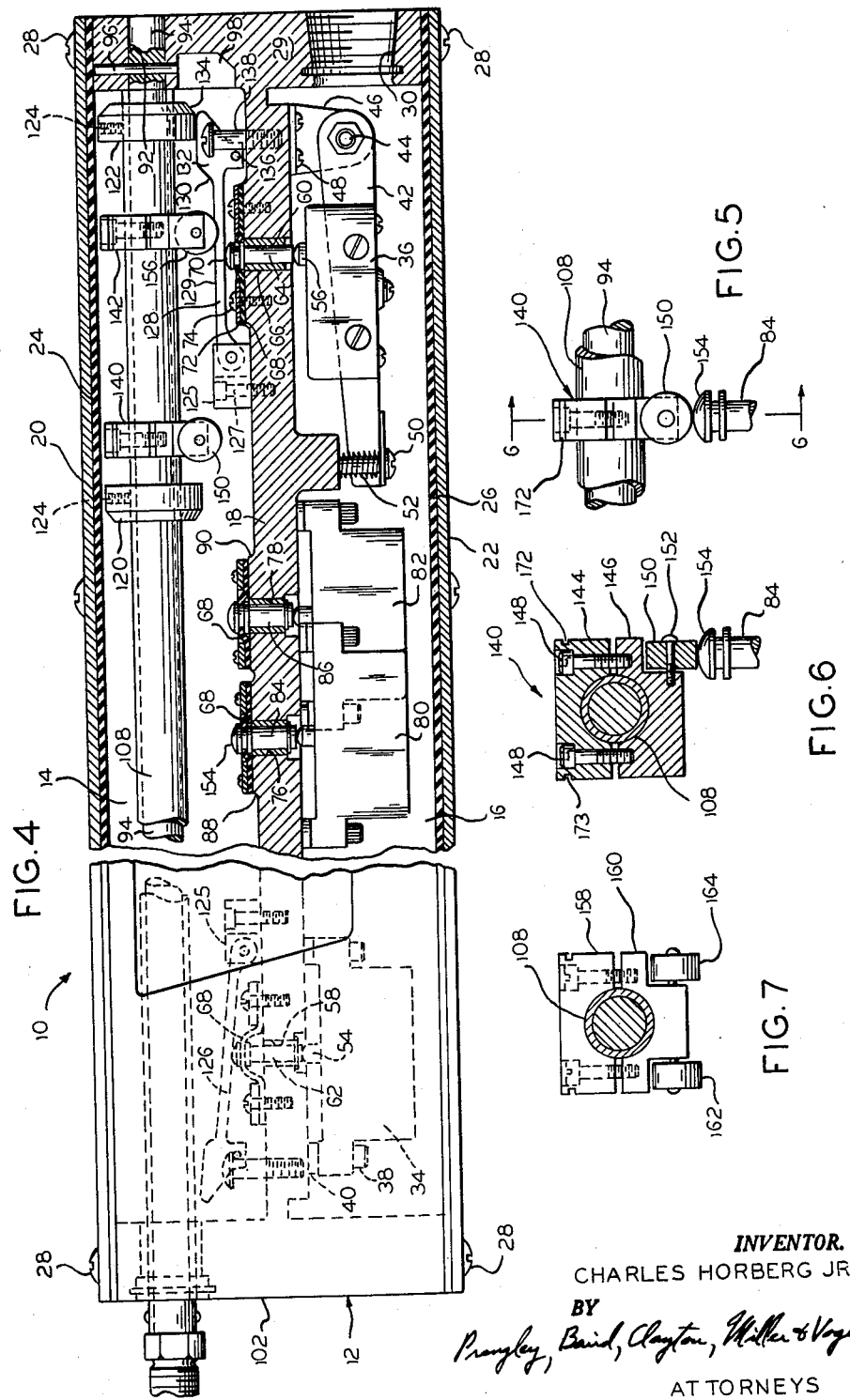

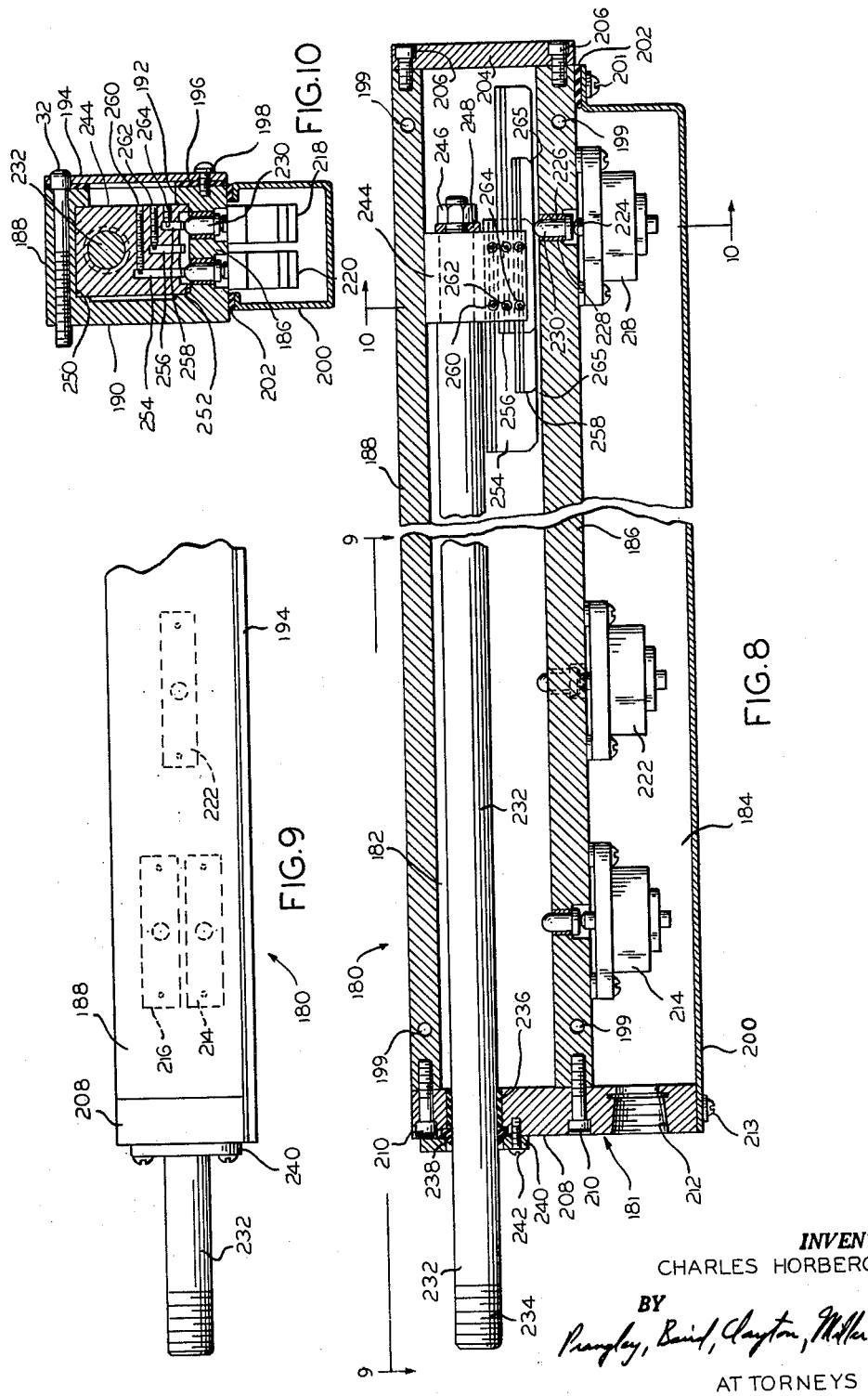

United States Patent Office 3,192,350
Patented June 29, 1965

3,192,350
SEALED ELECTRICAL SWITCHING CONTROL UNIT USING LINEAR CAM ACTUATOR
Charles Horberg, Jr., Chicago, Ill., assignor to Paramount Textile Machinery Co., Kankakee, Ill., a corporation of Illinois
Filed Dec. 6, 1961, Ser. No. 157,523
4 Claims. (Cl. 200—153)

This invention relates to a linear control unit adapted for the electrical control of mechanisms in response to movement or travel of parts thereof or of other mechanisms, and particularly, to an improved versatile and adaptable unit.

In my U.S. Patent No. 2,968,710, I have disclosed a new linear control unit which is very useful for controlling machines constructed of electrically controlled mechanisms. An important object of the present invention is to provide improvements thereon, including a more advantageous construction, and components which render the unit more versatile and adaptable.

A specific object is to provide a linear control unit wherein electrical components are isolated from mechanical components, thus providing a safe, reliable unit and a unit which may be maintained and repaired by mechanics or electricians as may be required, without need for both.

Another specific object is to provide a linear control unit which includes reversing limit switches and which is also adapted for providing additional switches to perform further functions, which additional switches may be actuated at selected points in the travel of a moving machine member connected to the unit.

Additional objects include the provision of novel switch actuating cam mounts or supports, sealing means for switch actuating parts and adjustable switch means.

A further object is to provide a simple, compact construction which is readily assembled and disassembled, and which is conveniently installed for the control of various mechanisms.

These and other objects, advantages and functions of the invention will be apparent on reference to the specification and to the attached drawings illustrating preferred embodiments of the invention, in which like parts are identified by like reference symbols in each of the views, and in which:

FIGURE 1 is a top plan view of one embodiment of the new linear control unit, schematically illustrating an arrangement of control switches therein;

FIG. 2 is a fragmentary side elevational view with parts broken away, taken adjacent one end of the unit;

FIG. 3 is an enlarged cross-sectional view taken on lines 3—3 of FIG. 1;

FIG. 4 is an enlarged broken side elevational and longitudinal sectional view of the unit;

FIG. 5 is an enlarged fragmentary side elevational view illustrating one of the switch actuating cams in engagement with an actuating plunger;

FIG. 6 is a cross-sectional view taken on line 6—6 of FIG. 5;

FIG. 7 is a view like FIG. 6 of an alternative embodiment of a cam carrying a plurality of cam elements;

FIG. 8 is a broken longitudinal sectional and elevational view of another embodiment of the linear control unit, schematically illustrating an arrangement of switches therein;

FIG. 9 is a fragmentary top plan view adjacent one end thereof, taken on line 9—9 of FIG. 8; and FIG. 10 is a cross-sectional view taken on line 10—10 of FIG. 8.

The linear control unit of the invention includes a hollow casing, a switch compartment in the casing, an actuator compartment in the casing, sealing means separating the switch compartment from the actuator compartment, control switch means within the switch compartment, an actuator movable in the actuator compartment, and means for actuating the switch means in response to movement of the actuator.

Referring to FIGS. 1–7 of the drawings, a preferred embodiment of the linear control unit is generally indicated by the number 10. It includes a hollow elongated right rectangular casing or housing 12 having an elongated rectangular mechanical or actuator compartment 14 and an elongated rectangular electrical or switch compartment 16 coextensive with the casing. The compartments are separated by a coextensive transverse rectilinear dividing wall or partition 18 which extends across the cavity in the casing to completely separate the compartments, in particular, to prevent any foreign materials, parts or implements from entering either compartment from the other. Employing the new construction, the parts are isolated for safety and reliability in use and in working on the units, and mechanics and electricians may work separately on the respective assemblies with which they are concerned.

The casing 12 is constructed preferably as a one-piece cast and machined aluminum body. Opposite sides of the casing which normally correspond to the top and bottom of the unit are open to provide separate access openings to the respective actuator and switch compartments 14 and 16. The respective openings are coextensive with the compartments, and they are closed by cover plates 20 and 22 and interposed neoprene gaskets 24 and 26, secured to the casing body by screws 28. An electrical outlet opening 30 is provided in an end wall 29 of the casing and communicates with the switch compartment 16 for connecting an electrical conduit to the unit. Additional outlet openings may be provided in other locations for increased convenience, in which case the unused openings are plugged. The unit is mounted in an appropriate location by means such as bolts 32 illustrated in the embodiment of FIG. 10, which bolts extend through holes in the casing and into engagement with securing means, not illustrated.

Two reversing limit switches 34 and 36 or the like are mounted centrally of the dividing wall 18 and adjacent the opposite ends of the switch compartment 16. Two types of switches are illustrated in the respective locations, but both switches may be either type, or their positions may be reversed. One switch 34 is mounted on the dividing wall by means of screws 38, with gaskets 40 interposed between the switch and the wall. The other switch 36 is adjustably mounted on the dividing wall. The switch 36 is fixed on an adjusting lever 42. One end of the lever is pivotally mounted by means of a pivot pin or bolt 44 on a depending bracket 46 secured to the dividing wall by screws 48. On the opposite side of the switch 36 from the pivot point, the lever is adjustably secured to the dividing wall by a bolt 50 and a spacer spring 52 which engages the lever 42 to hold it in its adjusted position.

Each of the switches 34 and 36 includes a movable operating member in the form of a cylindrical push button or pin 54 or 56 which extends outwardly therefrom and is resiliently urged by conventional spring means in the switch, not shown, in the direction of the actuator compartment 14. The switch buttons register with respective centrally disposed circular plunger openings or passages 58 and 60 in the dividing wall 18. Switch actuating pins or plungers 62 and 64 extend through the respective openings, from the actuator compartment 14 to the switch compartment 16, where they contact the switch buttons. The positions of the plunger 64 and the button 56 of the adjustable switch 36 when they are in contact are determined by the adjustment of the lever 42.

The plungers 62 and 64 are journaled in bearings, such as indicated at 66 for the plunger 64, mounted in the openings 58 and 60. In order to insure a water-tight closure and seal between the compartments, flexible resilient elastomeric diaphragms or seals 68 are secured in the grooves of grooved heads 70 on the pins, in the actuator compartment 14. The diaphragms are preferably made of neoprene. They are secured to the dividing wall 18 by means of washers 72 fastened by screws 74. The resilient diaphragms 68 support the plungers 62 and 64 for normally maintaining the switches 34 and 36 inoperative. The construction also cooperates in rapid restoration of the switches after they are actuated.

The new linear control unit is especially adapted for mounting additional switches to perform further functions at selected points in the travel of a moving machine member connected to the unit. Means are provided for mounting one or more additional switches within the limits of travel of the actuator, and especially, between the limit switches 34 and 36. As illustrated in FIG. 4, a series of additional openings such as transversely spaced openings 76 and 78, and others as schematically represented in FIG. 1, are provided in the separating wall 18 and are disposed between the center and the opposite margins or sides of the wall. Some or all of the openings may be employed for the installation of the switches, conveniently at the option of the user. The unused openings may be closed. The additional switches as illustrated at 80 and 82 in FIG. 4 may be the same as or different from the described limit switches 34 and 36, and they may be mounted to one side of the dividing wall 18, as shown, or centrally thereof. The switches are actuated by respective plungers 84 and 86 in the openings 76 and 78, and diaphragms 68 are provided as in the above-described construction. The respective openings 76 and 78 are provided in bosses 88 and 90 on the wall 18 which protrude into the actuator compartment 14. This construction serves to mount the plungers 84 and 86 at more convenient elevations in the actuator compartment. Similarly, further switches may be included in the unit, as represented in FIG. 1. It will be observed that the several plungers 62, 64, 76 and 86 and switches 34, 36, 80 and 82 engaged thereby are mounted along the dividing wall 18 and are disposed across the wall for selective actuation in the operation of the unit.

One end wall 29 of the casing 12 is provided with a cylindrical bore 92 extending into the actuator compartment 14. A cylindrical actuator support rod 94 is mounted longitudinally in the bore. The rod is secured in fixed position by means of a transverse pin 96 in the end wall, which is removable by driving into an inner wall pocket 98. As illustrated in FIG. 2, the rod 94 extends for the full length of the casing 12 centrally of its sides, and is supported within a longitudinal bore 100 in the opposite end wall 102. The rod terminates in an end having a reduced section 104 on which is mounted a sleeve bearing 106.

A cylindrical actuator tube 108 is mounted coaxially on the support rod 94 in axial slidable engagement therewith. The actuator 108 is secured by a coupling pin 110 to a coupling or threaded fitting 112. The coupling is suitably secured to a reciprocating machine member for linear reciprocating movement of the actuator 108 therewith. Thus, for example, the coupling may be secured to a machine slide which reciprocates linearly between two limits, as controlled by the limit switches 34 and 36. The actuator is journaled in a bearing 114 mounted in the wall bore 100. An outer wiper ring 116 preferably made of Teflon is held on the surface of the actuator against the bearing by means of a split ring 118 secured in a countersunk end of the bore.

Two oppositely directed circular cams or cam elements 120 and 122 are secured around the actuator 108, and they are positioned adjustably along the length of the actuator by means such as set screws 124. The cams 120 and 122 are thus mounted in spaced apart relation in the direction of the movement path of the actuator for movement with the actuator. The cams 120 and 122 actuate the respective limit switches 34 and 36, and the positions of the cams determine the limits or reciprocal movement of the actuator 108 in the actuator compartment 14. Two cam follower levers 126 and 128 extend in opposite directions adjacent the respective ends of the actuator compartment for engagement with the respective cams 120 and 122. The levers are pivotally mounted at an inner end of each on lugs 125 fastened to the dividing wall 18 by screws 127 and the levers extend outwardly over and rest on the respective adjacent outer plungers 62 and 64.

As indicated for the right-hand lever 128, each lever includes a contacting surface 129, an abruptly inclined cam follower surface 130, and a ledge 132. The cam follower surfaces and the ledges are on the outer ends of the levers 126 and 128, opposite to the pivotally mounted ends thereof. The cam follower surfaces of the levers are spaced apart along the actuator movement path for a distance greater than the distance between the cams 120 and 122. As the actuator 108 moves from left to right, as oriented in FIG. 4, the right-hand cam 122 first engages the contacting surface 129 and depresses the lever, thereby depressing the plunger 64 and the switch button 56. With continued actuator movement, a circumferential bevel or cam surface 134 on the face of the cam engages the inclined follower surface 130. Thereupon, the lever, plunger and switch button are depressed to their full extent, actuating the switch 36. Fine adjustment of the timing is made by adjusting the switch-mounting lever 42 and thereby the positions of the switch button 56 and the plunger 64. The cam 122 may ride a short additional distance on the lever ledge 132 to provide for corresponding over-travel while the switch button 56 remains depressed, as illustrated by the cam position in FIG. 4.

Actuation of the limit switch 36 causes the moving machine member to reverse its direction, and the actuator 108 moves in the reverse direction therewith. As the cam 122 clears the cam follower surface 130 on the lever 128, the plunger 64 is restored by the resilient diaphragm 68 and the resilient action of the switch button 56, to restore the switch 36. The lever 128 is moved upwardly by the plunger, and is prevented from excessive upward movement by a stop pin 136 which engages the head of a retaining screw 138 projecting from the dividing wall 18. As the left-hand cam 120 approaches the opposite end 102 of the unit, it engages the lever 126 to depress the plunger 62 and actuate the limit switch 34 in like manner. Thereupon, the direction of movement of the machine member and of the actuator 108 is again reversed, thus completing a cycle of operation.

Rectangular additional cams 140 and 142 are provided for actuating the respective additional switches 80 and 82 and other similarly oriented switches and are adjustably mounted on the actuator 108 as shown in FIGS. 3-6. In a preferred construction as shown for one cam 140, a cam mount is provided which constitutes a split block having upper and lower halves 144 and 146 secured together by means of screws 148. A cam element in the form of a roller 150 is rotatably mounted on one side of the lower block half 146, by means of a pin 152. The cams are reversible and the other cam 142 has the same construction but is arranged with its cam roller 156 on the opposite side of the block. The cam blocks are mountable on and removable from the actuator when the remainder of the control unit 10 is assembled, so that the user may add or remove cams conveniently. Thus, the cams and additional switches are made available as accessory parts which may be installed according to the requirements for controlling the operation of various mechanisms in relationship to the operation of the moving machine member.

A plunger head 154 on the plunger 84 constitutes a cam follower, whereby the plunger disposed on one side of the actuator compartment 14 is depressed upon engagement with the cam roller 150 of the one cam 140 to actuate the switch 80. Similarly, the roller 156 on the other cam 142 engages the plunger 86 on the opposite side of the actuator compartment to actuate the switch 82. The several cams 120, 122, 140 and 142 are thus engageable with the respective plungers 62, 64, 84 and 86 at points angularly disposed about the actuator 108, for selectively actuating the several switches without interference of parts which operate other switches. The construction enables a number of switches to be mounted in a single compact unit.

In the embodiment of FIG. 7, a split cam block including halves 158 and 160 is provided. On opposite sides of the lower half 160, two cam elements or rollers 162 and 164 are mounted. The cam elements thus are angularly disposed about the actuator 108 for operating switches disposed on opposite sides of its axis.

Anti-rotational guide means are provided for the rectangular cams 140 and 142, to prevent their turning and insure proper engagement with the switch actuating plungers. As illustrated in FIG. 3, tracks or rails 166 and 168 are mounted on the opposite side walls of the actuator compartment 14 by screws 170. The rails slidably engage the upper half of each cam block in grooves therein, as illustrated at 172 and 173 in the half 144.

FIGS. 8–10 illustrate another embodiment of the invention, wherein the actuator and cams are mounted in other ways and other changes and modifications are made in the unit. The linear control unit 180 includes a casing or housing 181, and an actuator compartment 182, a switch compartment 184, and a dividing wall 186 therein. The dividing wall 186, a top wall 188 and a side wall 190 of the actuator compartment 182 are components of a single casting which may be constructed of cast iron, for example. The remaining side of the actuator compartment includes an elongated access opening 192 (FIG. 10) which is closed by a side plate 194 and intervening gasket 196. The side plate is secured on the casting by screws 198. Bolts 32 extend transversely through mounting openings 199 in the divider wall 186 and the top wall 188, for mounting the unit in a suitable location to cooperate with a moving machine member.

The switch compartment 184 is composed of the separating wall 186 and a rectangular channel case 200 removably mounted on the casting by screws 201. A gasket 202 is interposed between the case 200 and the separating wall 186. This gasket and the side plate gasket 196 may be constructed of neoprene.

One end of the actuator compartment 182 is closed by an end plate 204 secured by screws 206. The opposite end is secured by an end plate 208 secured by screws 210. This end plate extends to provide an end closure for the switch compartment 184, and an opening 212 for an electrical conduit is provided in the extension of the plate. The case 200 is fastened to the end plate 208 by screws 213.

In this form of the invention, a pair of switches 214 and 216 (FIG. 9) is mounted in parallel adjacent one end of the switch compartment 184, and another pair of switches 218 and 220 (FIG. 10) is mounted adjacent the opposite end. The pairs of switches are adapted to control a plurality of circuits at each of the limits of the actuator travel.

Additional switches may be mounted in parallel or in staggered relationship between the end switches and adjacent the sides of the switch compartment, and one or more switches may be mounted in the center of the compartment, as illustrated by the switch 222. The switches are mounted on the separating wall 186, and switch buttons thereof as indicated at 224 for switch 218 register with wall openings such as 226. Bearings 228 are mounted in the openings and plungers 230 are sealingly mounted in the bearings to provide sealed connections between the actuator compartment 182 and the switches in the switch compartment 184.

A cylindrical actuator rod 232 is mounted for axial reciprocal movement in the actuator compartment 182, and it extends through the end plate 208 and terminates in a threaded end 234. The actuator is mounted in a bearing 236 in the end plate and is enclosed by an outer wiper ring 238. A retaining ring 240 is mounted on the outer surface of the end plate 208 around the actuator, by means of screws 242.

A cam mounting block 244 is secured on an inner reduced end of the actuator by a nut 246 threadedly engaging the end and an interposed washer 248. The cam block is received in rectangular grooves or recesses 250 and 252 (FIG. 10) in the top wall 188 and the separating wall 186 of the actuator compartment, for guiding the block and preventing rotation thereof.

Three elongated cam elements or strips 254, 256 and 258 are longitudinally adjustably mounted in corresponding grooves provided in the base of the cam mounting block 244. The cam elements are secured in their adjusted positions by means of pairs of set screws 260, 262 and 264 which extend through one side of the mounting block into registering longitudinal grooves in the respective cam elements.

The cam elements have flat bases and beveled corners 265 at the opposite ends of the bases. The corners and bases of the cam elements are arranged to contact one or more of the plungers for the switches to actuate the latter, as illustrated by the relationship of the cam element 258, the plunger 230, and the switch 218 in FIGS. 8 and 10. The cam elements are arranged angularly about the centrally disposed actuator 232 to extend across the separating wall 186 is spaced parallel relation for engagement with the switch actuating plungers disposed thereacross. The length of each cam element and its adjusted position are selected for engaging appropriate plungers, for engaging the plungers at appropriate positions of the actuator 232 in its travel, and for regulating the time during which the plungers are depressed and the switches actuated.

In use, the control unit 10 or 180 is mounted on a flat surface, such as by means of the mounting screws 32 inserted through the casing openings 199 in the embodiment of FIGS. 8–10. The unit is mounted parallel in two planes to the movement of a reciprocally movable machine member or slide to be controlled. The coupling 112 of the unit 10 or the threaded end 234 of the unit 180 is linked to the machine member for axial reciprocal movement therewith by a suitable self-aligning coupling arrangement, e.g., a fork, yoke, clevis, bracket or the like. The positions of the cam elements, such as the circular cams 120 and 122 illustrated in FIG. 4, are adjusted to provide the desired stroke length by actuation of the limit switches 34 and 36 at appropriate relative positions of the actuator 108. The cam elements which control other switches for performing additional functions, such as the cam elements carried by the cams 140 and 142 as shown in FIG. 4, are adjusted for actuation of the switches such as 80 and 82 at the proper times. Additional switches and additional cams for actuating the switches may be installed conveniently.

As the actuator 108 travels from the position illustrated in FIG. 4 to the left, the switch 36 is restored, switches such as 80 and 82 are actuated, and at the end of the stroke, the limit switch 34 is actuated. The machine member reverses its direction of movement and the direction of movement of the actuator 108. The actuator then moves from left to right, causing the restoration of the limit switch 34, the actuation of intervening switches, and finally the actuation of the right-hand limit switch 36. The direction of movement is again reversed, and the cycle is repeated. The embodiment of FIGS. 8–10 operates in a similar manner.

The unit is relatively simple and compact while being adapted to perform a number of functions controlled by the movement of the machine member. The construction of the unit assures safety and reliability in operation, and the mechanical and electrical parts are individually accessible for inspection or repair.

It will be apparent that various changes and modifications may be made in the construction and arrangement of the parts within the spirit and scope of the invention. It is intended that such changes and modifications be included within the scope of the appended claims.

I claim:

1. A linear electrical switching control unit which comprises, in combination, a hollow casing, a switch compartment in said casing, means for sealing said switch compartment from the surrounding atmosphere, an actuator compartment in said casing adjacent to said switch compartment, a partition in said casing separating said compartments, an actuator in said actuator compartment extending through a wall thereof and projecting externally therefrom, means mounting said actuator on said casing for reciprocal movement along a linear movement path, means for sealing said actuator compartment from the surrounding atmosphere including sealing means interposed between said actuator and said compartment wall, a plurality of cams on said actuator in said actuator compartment and spaced apart in the direction of said movement path, means mounting said cams for movement with said actuator, means providing a plurality of openings extending through said partition between said compartments and being spaced apart along said movement path, a plurality of discrete switches each having a member movable to operate the switch, means mounting said switches in said switch compartment with the movable members of the several switches registering respectively with said partition openings, a plurality of plungers in respective partition openings and extending into said actuator compartment, means mounting said plungers for reciprocal movement in said openings to and from said switch movable members for moving the latter in response to said plunger movement towards them to thereby operate said switches, sealing means interposed between said plungers and said partition to thereby isolate said compartments from each other, and cam follower means for interengaging said cams and said plungers to thereby move said plungers and operate said switches in response to said actuator movement.

2. A unit as defined in claim 1 wherein said casing includes a cover plate for each said compartment providing a compartment wall, and including means mounting said cover plates for removal individually from said compartments for separate access thereto.

3. A unit as defined in claim 1 wherein said cam mounting means for at least some of said cams include attachment means individually separable from said actuator disposed in said actuator compartment to permit said latter cams to be mounted on and removed from said actuator individually when the remainder of the unit is assembled.

4. A linear electrical switching control unit which comprises, in combination, a hollow casing, a switch compartment in said casing, means for sealing said switch compartment from the surrounding atmosphere, an actuator compartment in said casing adjacent to said switch compartment, a partition in said casing separating said compartments, an actuator in said actuator compartment extending through a wall thereof and projecting externally therefrom, means mounting said actuator on said casing for reciprocal movement along a linear movement path, means for sealing said actuator compartment from the surrounding atmosphere including sealing means interposed between said actuator and said compartment wall, a plurality of cams on said actuator in said actuator compartment and spaced apart in the direction of said movement path, means mounting said cams for movement with said actuator, means providing a plurality of openings extending through said partition between said compartments and being spaced apart along said movement path, a plurality of discrete switches each having a push button movable for operating the switch, means mounting said switches in said switch compartment with said push buttons of the several switches registering respectively with said partition openings, a plurality of plungers in respective partition openings and extending into said actuator compartment, means mounting said plungers for slidable reciprocal movement in said openings to and from said push buttons for engaging and moving the latter in response to said plunger movement towards them to thereby operate said switches, a flexible diaphragm interposed between each of said plungers and said partition to thereby isolate said compartments from each other, a pair of levers disposed in said actuator compartment adjacent respective ones of said plungers, means pivotally mounting one end of each of said levers on said partition between said adjacent plungers, said levers extending in opposite directions from said one end of each over said adjacent plungers respectively for engaging and moving the latter in response to pivotal lever movement towards them, said levers extending to opposite ends thereof each having a cam follower means thereon engageable with one of said spaced apart cams, said cam follower means on said opposite ends being spaced apart along said movement path for a distance greater than the distance between said cams engageable therewith, whereby when said actuator is moved in the respective directions of reciprocal movement, said latter cams respectively engage said cam follower means to pivotally move said levers and thereby move said adjacent plungers towards said push buttons to operate said switches.

References Cited by the Examiner
UNITED STATES PATENTS

| | | | |
|---|---|---|---|
| 2,018,958 | 10/35 | Jones et al. | 200—153 |
| 2,493,190 | 1/50 | Fuchs | 200—166 |
| 2,537,308 | 1/51 | Hansen | 137—157 |
| 2,639,337 | 5/53 | Framhein | 200—153 |
| 2,648,234 | 8/53 | Lester | 200—153 |
| 2,769,882 | 11/56 | Vitus et al. | 200—168 |
| 2,838,622 | 6/58 | Bachi | 200—153 |
| 2,914,626 | 11/59 | Weishew | 200—47 |
| 3,042,764 | 7/62 | Hermle | 200—47 |

BERNARD A. GILHEANY, *Primary Examiner.*
ROBERT K. SCHAEFER, *Examiner.*